(12) United States Patent
Brackman

(10) Patent No.: US 8,255,912 B2
(45) Date of Patent: Aug. 28, 2012

(54) TECHNIQUES FOR SETTING EVENTS IN A MULTI-THREADED SYSTEM

(75) Inventor: David Brackman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1438 days.

(21) Appl. No.: 11/105,913

(22) Filed: Apr. 13, 2005

(65) Prior Publication Data

US 2006/0236322 A1    Oct. 19, 2006

(51) Int. Cl.
G06F 9/46 (2006.01)
G06F 13/24 (2006.01)

(52) U.S. Cl. .................. 718/103; 718/102; 710/260

(58) Field of Classification Search .............. 718/100, 718/102, 103
See application file for complete search history.

(56) References Cited

U.S. PATENT DOCUMENTS

| | | | |
|---|---|---|---|
| 5,706,515 A * | 1/1998 | Connelly et al. | 718/106 |
| 5,961,584 A * | 10/1999 | Wolf | 718/103 |
| 6,006,247 A * | 12/1999 | Browning et al. | 718/102 |
| 6,061,709 A * | 5/2000 | Bronte | 718/103 |
| 6,101,524 A * | 8/2000 | Choi et al. | 718/102 |
| 6,105,053 A * | 8/2000 | Kimmel et al. | 718/105 |
| 6,115,715 A * | 9/2000 | Traversat et al. | 717/121 |
| 6,128,640 A * | 10/2000 | Kleinman | 718/102 |
| 6,587,955 B1 * | 7/2003 | Foote et al. | 713/400 |
| 6,823,517 B1 * | 11/2004 | Kalman | 718/108 |
| 6,845,504 B2 * | 1/2005 | Hua et al. | 718/104 |
| 6,874,144 B1 * | 3/2005 | Kush | 718/103 |
| 6,907,606 B1 | 6/2005 | Jang | |
| 7,065,765 B2 * | 6/2006 | Cadden et al. | 718/102 |
| 7,117,496 B1 * | 10/2006 | Ramesh et al. | 718/102 |
| 7,278,141 B2 * | 10/2007 | Accapadi et al. | 718/103 |
| 7,380,247 B2 * | 5/2008 | Accapadi et al. | 718/103 |
| 7,448,036 B2 * | 11/2008 | Brenner et al. | 718/103 |
| 2001/0027464 A1 * | 10/2001 | Tavoletti et al. | 709/103 |

(Continued)

FOREIGN PATENT DOCUMENTS

JP    2000194573    7/2000

(Continued)

OTHER PUBLICATIONS

Lui Sha et al., "Priority Inheritance Protocols: An Approach to Real-Time Synchronization". IEEE Transactions on Computers, IEEE Service Center, Los Alamitos, CA, US. vol. 39, No. 9: Sep. 1, 1990.

(Continued)

Primary Examiner — Jennifer To
Assistant Examiner — Tammy Lee
(74) Attorney, Agent, or Firm — Kevin T. Cheatham

(57) ABSTRACT

To set one or more events without intermediate scheduling of threads in a multi-threaded system, a scheduler is first rendered essentially ineffective. The events are then set, for example, by repeatedly calling a function to set a single event, once for each event to be set. The scheduler is then restored to its normal effectiveness. The scheduler may be rendered ineffective by artificially setting the priority of the current thread being processed to the highest possible priority level. This prevents the current thread from being preempted by another thread during the time that events are being set. After all events have been set, the priority of the current thread is restored to the original priority level, which then restores the scheduler to its normal effectiveness.

32 Claims, 7 Drawing Sheets

U.S. PATENT DOCUMENTS

| | | | | |
|---|---|---|---|---|
| 2001/0034751 | A1* | 10/2001 | Eto et al. | 709/100 |
| 2002/0138679 | A1* | 9/2002 | Koning et al. | 710/244 |
| 2002/0165999 | A1* | 11/2002 | Hardin et al. | 709/318 |
| 2003/0154234 | A1* | 8/2003 | Larson | 709/107 |
| 2004/0226016 | A1* | 11/2004 | Sreejith | 718/104 |
| 2006/0085791 | A1* | 4/2006 | Day et al. | 718/100 |
| 2006/0117316 | A1* | 6/2006 | Cismas et al. | 718/103 |

FOREIGN PATENT DOCUMENTS

| | | |
|---|---|---|
| KR | 20000060827 | 10/2000 |
| KR | 100617228 | 8/2006 |
| WO | WO03062988 | 7/2003 |

OTHER PUBLICATIONS

International Search Report and Written Opinion—PCT/US2006/014306. International Search Authority—European Patent Office—Sep. 28, 2006.

Taiwanese Search Report—TW095113191—Search Authority—TIPO—Jun. 24, 2009.

Paul Yao, "Windows CE 3.0: Expansion of Real-time Feature that Provides Advanced Thread Handling," msdn Magazine, Japan, ASCII Corporation, Dec. 18, 2000, No. 9, pp. 4-55.

Shinya Koga, "World of Programming Enjoyed with Art of BeOS Programming—BeOS," Jun. 30, 1998, pp. 282-294.

* cited by examiner

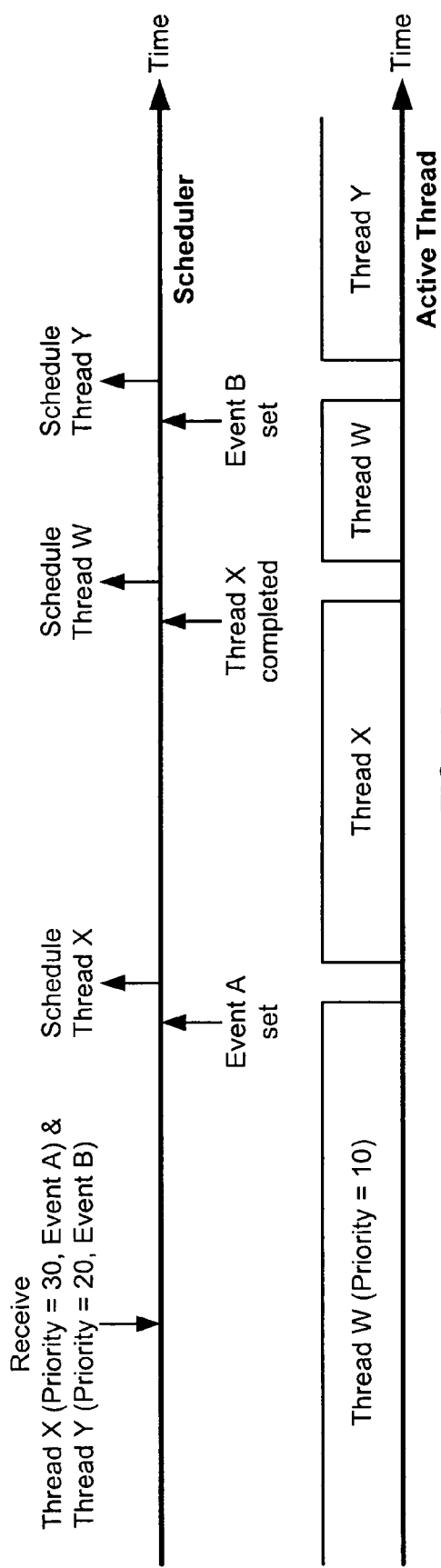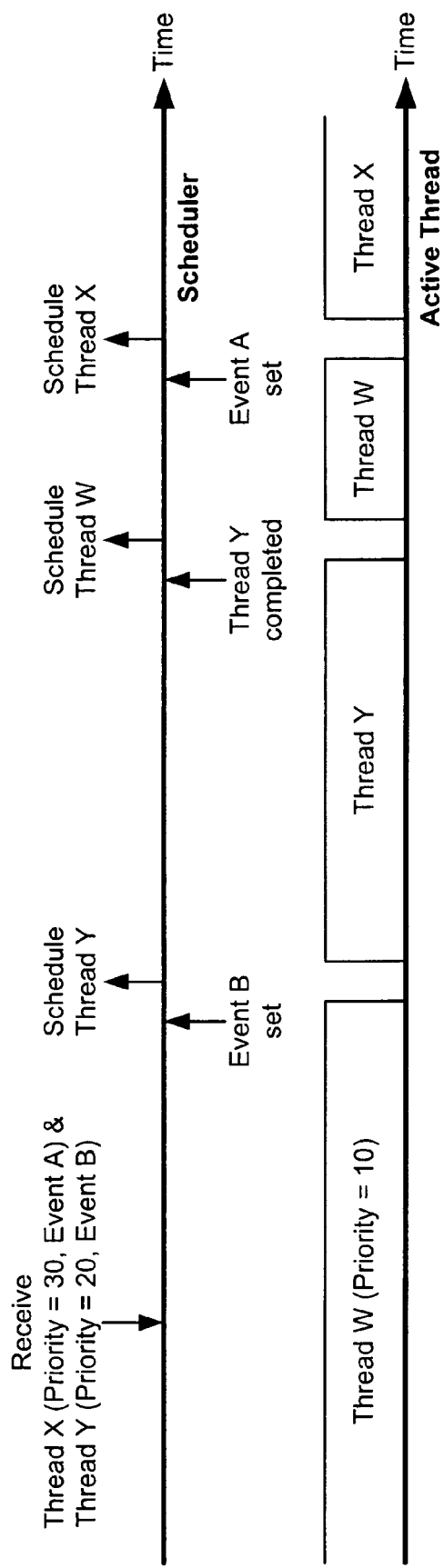

TECHNIQUES FOR SETTING EVENTS IN A MULTI-THREADED SYSTEM

BACKGROUND

I. Field

The present invention relates generally to computer processing, and more specifically to techniques for setting events in a multi-threaded system.

II. Background

Operating systems are one common type of a multi-threaded system. An operating system manages various system resources (e.g., hardware units, storage devices, interfaces, and so on) and provides services that allow applications running over the operating system to access the system resources. The operating system typically provides these services via threads that are invoked, scheduled, and processed as appropriate. A thread may be viewed as a task to be performed.

Real-time operating systems are one class of operating systems and are commonly used for many electronic devices such as wireless devices (e.g., cellular phones), digital personal assistants (PDAs), and so on. A key attribute of a real-time operating system is preemptive priority-based scheduling. This type of scheduling attempts to schedule threads such that the thread with the highest priority among all threads that are ready for execution is processed first. Each thread is associated with a particular priority and possibly an event that needs to be set before the thread can be processed. Whenever an event is set, the operating system determines which threads are ready for execution (i.e., not waiting on any event, or waiting on an event that has been set) and schedules the highest priority thread that is ready. The thread that is currently being processed may be preempted by another thread having a higher priority and ready for execution.

A real-time operating system may allow an active thread to set a single event at a time. However, the active thread may have multiple events to set, and the order in which the active thread sets these events may affect the order in which threads are scheduled, as described below. System performance may be degraded if threads are scheduled in an undesirable order due to the order in which the events are set.

There is therefore a need in the art for techniques to set events in a multi-threaded system.

SUMMARY

Techniques for setting events without intermediate scheduling of threads by a scheduler in a multi-threaded system (e.g., a real-time operating system) are described herein. To set one or more events in the multi-threaded system, the scheduler is first rendered essentially ineffective. The events are then set, for example, by repeatedly calling a function to set a single event. This function may be called once for each event to be set. The scheduler is then restored to its normal effectiveness.

In an embodiment, the scheduler is rendered ineffective by artificially setting the priority of the current thread being processed to a high priority level, e.g., the highest possible priority level in the system. This prevents another thread from being scheduled in, and the current thread from being preempted by another thread, during the time that the events are being set. After all events have been set, the priority of the current thread is restored to the original priority level. This then restores the scheduler to its normal effectiveness since the current thread can now be preempted by another thread with a higher priority.

The event setting techniques described herein may be used for a software system, a hardware system, or a system with both hardware and software. For example, codes to set events without intermediate scheduling may be implemented as a software function that may be called by threads. This function may in turn call another software function (e.g., provided by an operating system) to set a single event at a time.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIGS. 2A and 2B show scheduling of two threads waiting on two events, which are set in different orders in FIGS. 2A and 2B.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
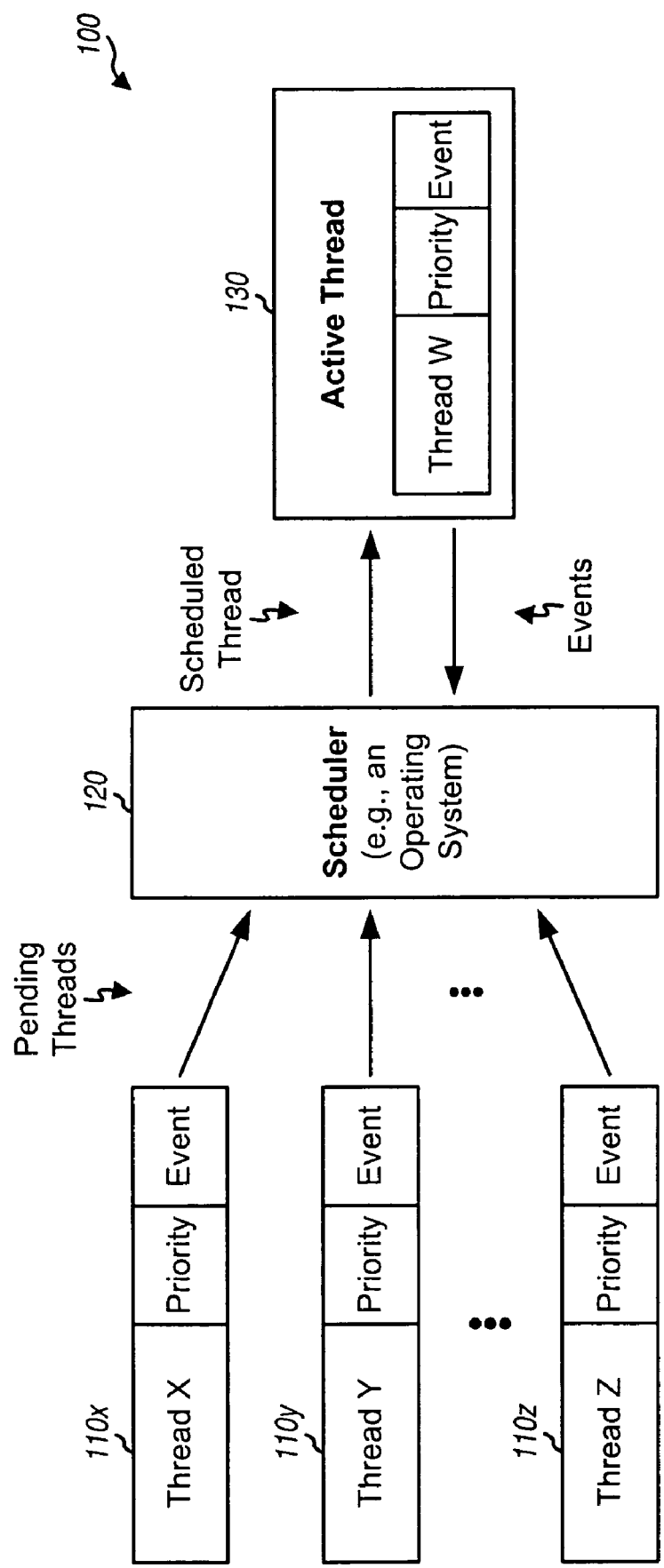
FIG. 1 shows an exemplary multi-threaded system.

FIG. 1 shows a diagram of an exemplary multi-threaded system 100 in which the event setting techniques described herein may be employed. Threads 110$x$, 110$y$, and 110$z$ may be invoked by applications (not shown in FIG. 1) and are to be scheduled and executed. A thread is a task to be performed by an entity, which may also be a thread. A thread may be associated with (1) software code to be executed for a task and (2) state information for the task, e.g., registers, stack, variables, and so on. A thread may be in one of multiple possible states (e.g., "pending", "ready", and "active") at any given moment. As used herein, a "pending" thread is a thread that is waiting on an event before it can be scheduled, a "ready" thread is a thread that is ready for execution (i.e., not waiting on any event) and may be scheduled, and an "active" thread is a thread that has been scheduled and is currently running.

Each thread 110 is associated with a priority level/value that indicates the importance of that thread. The priority of each thread may be determined, e.g., by the priority assigned to the application invoking that thread. A range of priority values may be used for the system, and a higher priority value may correspond to greater importance. The priority value for each thread is then selected from the range of possible priority values based on the relative importance of that thread. Each thread 110 is further associated with zero, one, or multiple pending events. An event is indicative of a state or a condition of a thread. In the context of operating system, an event is also referred to as a signal, a flag, a message, or some other terminology. A pending event is an event that at least one thread is waiting on before the thread(s) can be scheduled.

A scheduler 120 receives threads 110 and schedules these threads for execution. Typically, only one thread 110 is scheduled at any given moment, and the scheduled thread becomes an active thread and executes. Scheduler 120 schedules threads 110 based on (1) the priority values and the pending events for these threads and (2) the events set by an active thread 130 that is currently running. Scheduler 120 further schedules the threads such that, at any given moment, the thread with the highest priority and ready for execution is running.

Active thread 130 is a thread that is scheduled by scheduler 120 and is currently running. Active thread 130 also sets events that are applicable for the active thread and which may be used by scheduler 120 for scheduling other pending threads 110. Active thread 130 may set each event whenever the associated state or condition occurs.

Multi-threaded system 100 may be a software system, a hardware system, or a system with both software and hardware. For clarity, certain portions of the following description are for a specific multi-threaded system in which scheduler 120 is part of an operating system (e.g., a real-time operating system).

The operating system may allow a thread (e.g., active thread 130) to set a single event at a time. Whenever an event is set, the operating system performs actions appropriate for the event just set. For example, the operating system may schedule pending threads based on events set by active thread 130. Whenever an event is set, the operating system identifies all threads that are ready for execution, which includes pending threads waiting on the event just set and the thread currently being processed. The operating system then schedules the ready thread with the highest priority for execution.

Active thread 130 may set events as they occur, a single event at a time if required by the operating system. In general, active thread 130 may set any number of events and any particular event during the processing of the current thread, depending on the state of the active thread. Active thread 130 may not be aware of (1) the pending threads waiting to be scheduled or (2) the events that these pending threads are waiting on. Consequently, active thread 130 does not attempt to set the events in a preferential order determined based on the pending threads and their pending events.

Active thread 130 may set multiple events during or upon completing the processing of the current thread. Furthermore, scheduler 120 may schedule threads 110 each time an event is set. In this case, threads 110 may be scheduled in different orders depending on the order in which the events are set, as illustrated below.

FIG. 2A shows a scheduling example for two pending threads waiting on two events. In this example, active thread 130 is initially thread W, which has a low priority of 10. Thread X has a high priority of 30 and is waiting on event A, and thread Y has an intermediate priority of 20 and is waiting on event B. Threads X and Y may both be waiting for active thread 130 to complete a write to memory so that they can perform their own writes to memory. Event A may be a "write complete" event, and event B may be a "memory driver available" event. In this case, active thread 130 may set both events when it is finished with the current write. However, active thread 130 may be constrained by the operating system and may be able to set only one event at a time. Active thread 130 has no knowledge of the priorities of pending threads X and Y that are waiting on these two events. Active thread 130 may set these two events in any order, one event at a time.

For the example shown in FIG. 2A, active thread 130 sets event A first and then sets event B later. Upon receiving an indication of event A being set, scheduler 120 schedules thread X since it is now ready for execution and has a higher priority than the current thread W. Thread X preempts the current thread W and executes as active thread 130. Thread W then moves to the ready state and does not get a chance to set event B. After thread X has completed and goes back to the pending state, scheduler 120 schedules thread W, which is the only thread that is ready. Thread W becomes active again and sets event B. Upon receiving an indication of event B being set, scheduler 120 schedules thread Y since it is now ready for execution and has a higher priority than thread W. Thread Y preempts thread W and executes as active thread 130. In this example, threads X and Y are scheduled in the desired order since thread X has a higher priority than thread Y and is scheduled before thread Y.

FIG. 2B shows the scheduling of the two pending threads X and Y in a different order due to the two events being set in a different order. In this example, active thread 130 sets event B first and then sets event A later. Upon receiving an indication of event B being set, scheduler 120 determines that thread Y is now ready for execution and schedules thread Y since it has a higher priority than the current thread W. Thread Y preempts thread W and executes as active thread 130. After thread Y has completed and goes back to the pending state, scheduler 120 schedules thread W, which becomes active again and sets event B. Upon receiving an indication of event A being set, scheduler 120 determines that thread X is now ready for execution and schedules thread X since it has a higher priority than thread W. In this example, threads X and Y are scheduled in an undesired order. Even though either thread X or Y may be scheduled after thread W sets the events, thread Y with a lower priority is scheduled in before thread X because the two events are set in the wrong order, i.e., wrong for this example.

As shown in FIGS. 2A and 2B, the pending threads may be scheduled in different orders (and sometimes in an undesirable order) depending on the order in which events are set. Improved performance may be achieved by setting events in a manner such that the scheduler does not perform intermediate scheduling after each event is set.

Figure 3:
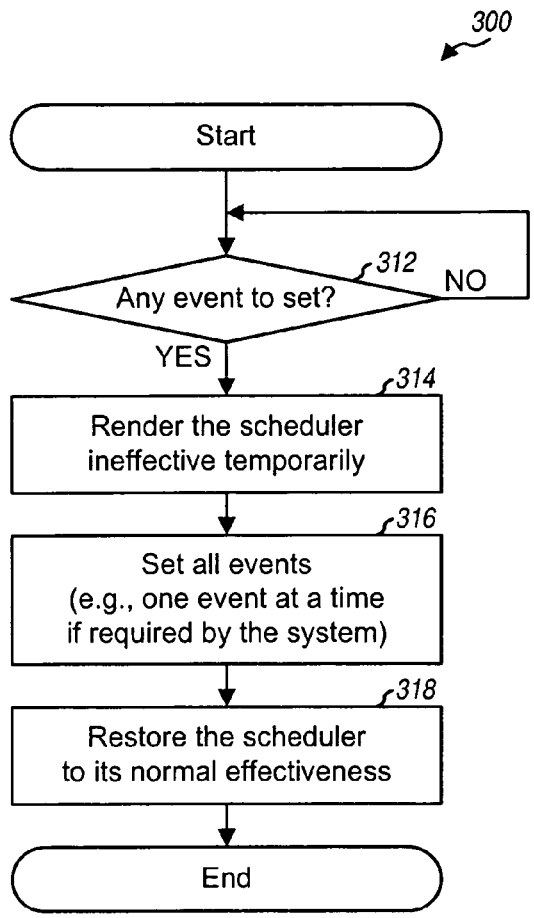
FIG. 3 shows a process for setting events without intermediate scheduling.

FIG. 3 shows a process 300 for setting any number of events without intermediate scheduling of threads by scheduler 120. Process 300 may be performed by active thread 130.

A determination is initially made whether there is any event to set (block 312). If the answer is 'No', then process 300 returns to block 312 and waits. Otherwise, if one or more events are to be set and the answer is 'Yes' for block 312, then the scheduler is rendered essentially ineffective for the time duration while the events are being set (block 314). The scheduler may be rendered ineffective using various mechanisms such as, for example, (1) by manipulating the priority of the current thread, as described below, (2) by locking interrupts (e.g., a time tick interrupt) that prevent scheduling based on timers that age via a hardware timer interrupt, or (3) by setting an appropriate flag to instruct the scheduler not to schedule the threads while this flag is set. All of the events are then set, e.g., one event at a time if required by the system (block 316). After all events have been set, the scheduler is restored to its normal effectiveness (block 318). The scheduler can now schedule threads in the proper order based on all of the events that have been set.

A specific embodiment for rendering the scheduler ineffective in order to set events is described below. This embodiment manipulates the priority of the current thread to render the scheduler essentially ineffective.

Figure 4:
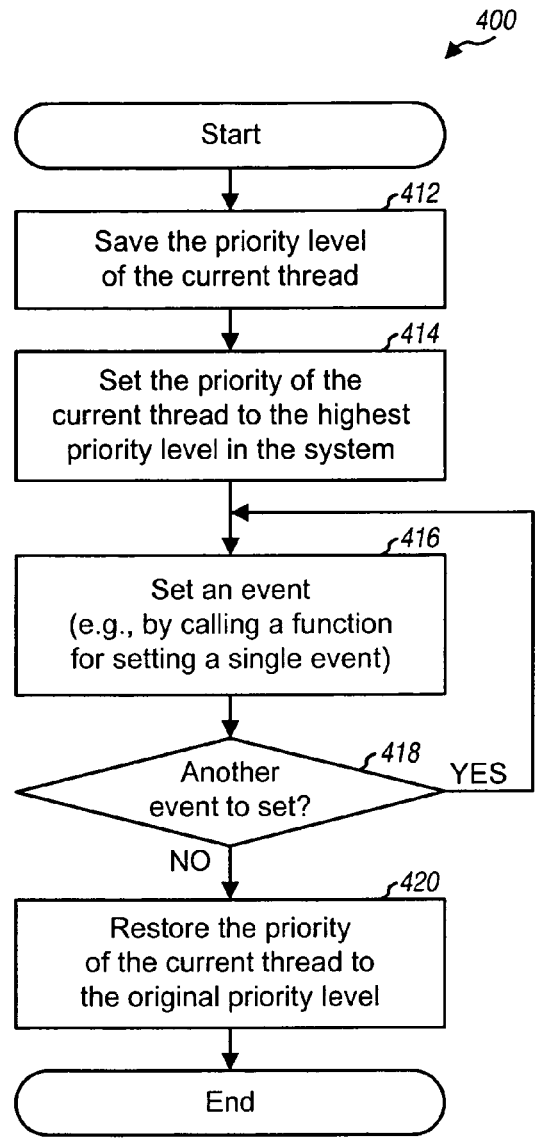
FIG. 4 shows a process for setting events without intermediate scheduling by manipulating priority.

FIG. 4 shows a process 400 for setting any number of events without intermediate scheduling of threads by scheduler 120 by manipulating priority. Process 400 may be performed by active thread 130 whenever there are one or more events to set. Process 400 may be used for blocks 314, 316, and 318 of process 300 in FIG. 3. Process 400 may also be implemented as a function (e.g., a Set Events function) that is called by active thread 130 in order to set events.

Initially, the priority level of the current thread, which is thread W for the examples in FIGS. 2A and 2B, is saved to a temporary location (block 412). The priority of the current thread is then artificially set to a high priority level, e.g., the highest possible priority level in the system (block 414). It is possible that a pending thread with a higher priority than the current thread may be waiting on a particular event. For a real-time operating system with preemptive priority-based scheduling, the pending thread would be scheduled and would preempt the current thread if this particular event is set. To avoid preemption of the current thread by another thread while events are being set, the priority of the current thread may be temporarily raised to the highest possible priority level.

An event is then set, for example, by calling a function for setting a single event (e.g., a Set Event function) (block 416). The setting of this event may trigger the scheduler to execute a scheduling algorithm and schedule the thread with the highest priority among all threads that are ready for execution. However, since the priority of the current thread is raised to the highest possible level, another thread will not be scheduled in and the current thread will continue to be processed. A determination is then made whether another event needs to be set (block 418). If the answer is 'Yes', then process 400 returns to block 416 to set another event, e.g., by calling again the Set Event function for setting a single event. Otherwise, if there are no other events to set and the answer is 'No' for block 418, then the priority of the current thread is restored to the original priority level (block 420).

The priority of the current thread may be changed by calling an appropriate function (e.g., a Set Thread Priority function). Calling this function typically triggers the scheduler, which then schedules the threads appropriately. When the current thread is set to the highest possible priority level in block 414, another thread is not scheduled in because the current thread is at the highest level. When the current thread is restored to the original priority level in block 420, the scheduler performs the normal scheduling and the current thread may be preempted by another thread that is ready and has a higher priority.

Figure 2C:
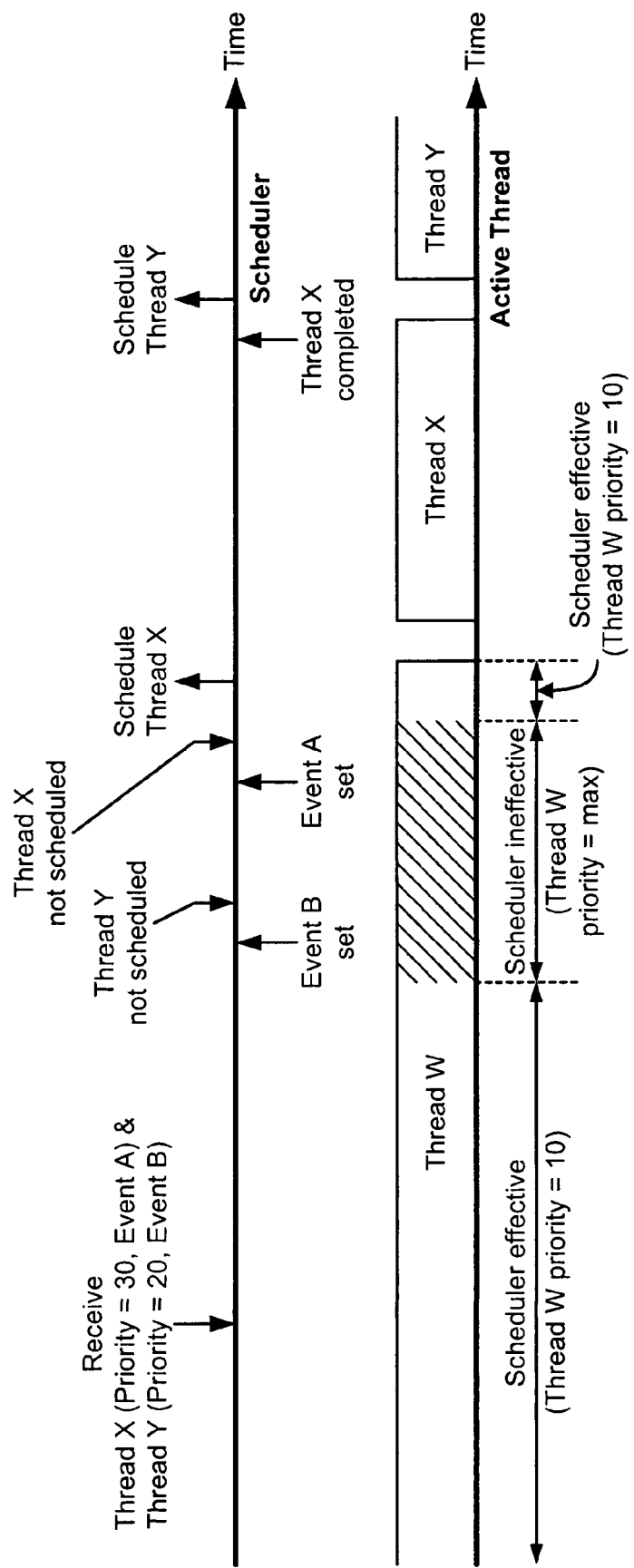
FIG. 2C shows scheduling of two threads waiting on two events, which are set without intermediate scheduling.

FIG. 2C shows the scheduling of the two pending threads X and Y with the two events being set "simultaneously" using the techniques described herein. In this example, scheduler 120 is effective while active thread 130 is executing, e.g., by maintaining thread W at the original priority level. Prior to setting events A and B, active thread 130 renders scheduler 120 essentially ineffective, e.g., by raising the priority of thread W to the highest possible level. Active thread 130 then sets event B, which does not trigger the scheduling of thread Y even though this thread is ready. Active thread 130 then sets event A, which does not trigger the scheduling of thread X or Y even though these threads are ready. Active thread 130 then restores scheduler 120 to its normal effectiveness, e.g., by restoring the priority of thread W to the original level. Scheduler 120 then schedules thread X, which has a higher priority level among the two threads X and Y that are ready. When thread X has completed, the scheduler schedules thread Y.

Figure 5:
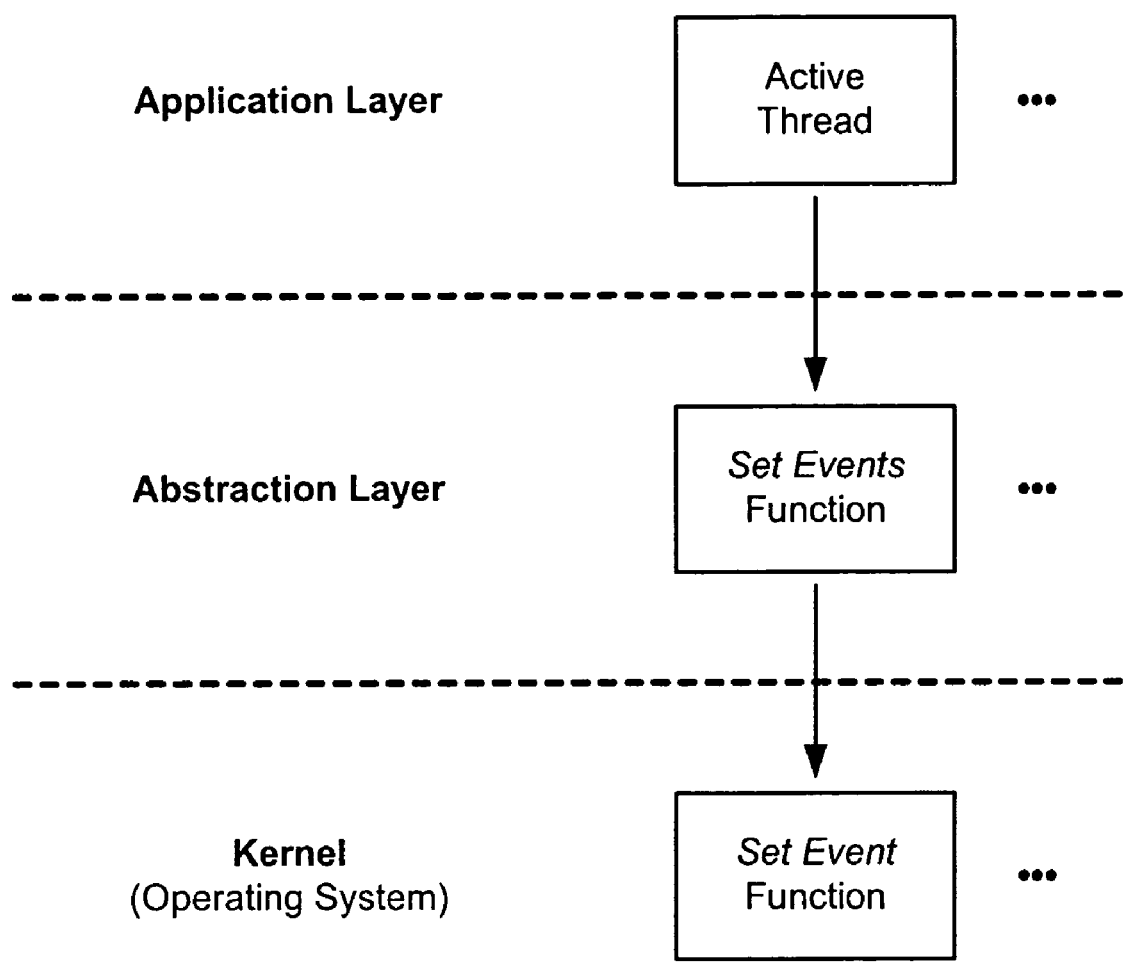
FIG. 5 shows an implementation of the process in FIG. 4.

FIG. 5 shows an exemplary implementation of process 400 in FIG. 4 in the context of an operating system. The operating system includes a kernel with various software functions that may be called to provide basic services. One such software function may be the Set Event function that allows a thread to set a single event. The operating system may be an off-the-shelf operating system, and it may not be possible or easy to modify the software functions in the kernel.

An abstraction layer may be implemented on top of the kernel in order to provide additional functionality and/or for customization. The abstraction layer may include additional software functions, such as the Set Events function that allows a thread to set any number of events. The threads running at an application layer above the abstraction layer may call the software functions in the abstraction layer, which may in turn call the software functions in the kernel. Process 400 may be implemented by the Set Events function in the abstraction layer, which may in turn call the Set Event function in the kernel once for each event to be set.

FIG. 5 shows a specific implementation of process 400 in FIG. 4. Other implementations are also possible, and this is within the scope of the invention.

Processes 300 and 400 allow a thread to simultaneously set all events without intermediate scheduling by the scheduler. Although the scheduler may attempt to schedule threads after each event is set, the scheduler is rendered essentially ineffective and another thread is not scheduled in. Process 400 renders the scheduler ineffective by changing the priority of the current thread so that this thread will not be preempted during the setting of events.

Other mechanisms for rendering the scheduler ineffective may also be used. For example, the scheduler may be rendered ineffective with a time-based mechanism that prevents asynchronous timed events from causing a reschedule. As an example, a user interface (UI) thread may want to flash a status indicator every second. The operating system would then wake up the UI thread to flash the icon every second. If the UI thread has a higher priority than threads X, Y, and W, then these threads will be preempted by the UI thread when it is awaken. Interrupt locking can prevent the scheduling of the UI thread, since the timer interrupt would fail to get vectored, and the UI thread would therefore never get woken up. Another mechanism for rendering the scheduler ineffective is by setting a flag (e.g., a Do_Not_Schedule flag) that the scheduler checks whenever it wants to schedule. The scheduler refrains from scheduling if this flag is set and proceeds with scheduling if the flag is unset/clear. The active thread may set this flag whenever it wants to disable the scheduler, and then unset the flag to re-enable the scheduler. While the scheduler is disabled, multiple events can be set without intermediate scheduling.

For clarity, the event setting techniques have been described in the context of an operating system. In general, these techniques may be used for any multi-threaded system in which tasks are scheduled based on priority and events. The multi-threaded system may be a software system, a hardware system, or a system with both hardware and software.

Figure 6:
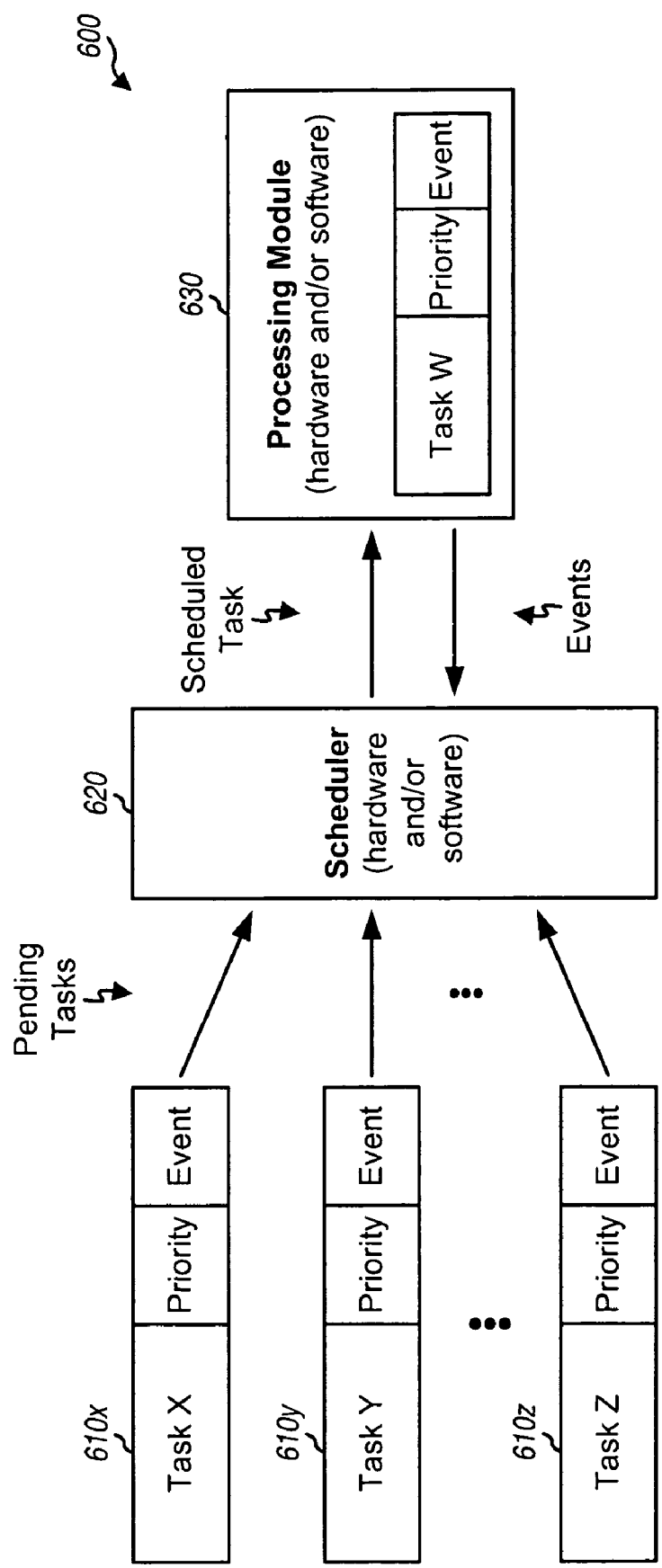
FIG. 6 shows another multi-threaded system.

FIG. 6 shows a diagram of a multi-threaded system 600 in which the event setting techniques may be employed. Tasks 610x, 610y, and 610z are received from one or more entities not shown in FIG. 6 and are to be scheduled and executed. Tasks 610 may be threads, processes, and so on. Tasks 610 may also be generated by one or more processors or applications and/or received via one or more interfaces.

A scheduler 620 receives tasks 610 and schedules these tasks for processing by a processing module 630. Scheduler 620 may schedule tasks 610 based on (1) the priority values and pending events for these tasks and (2) the events set by processing module 630. Scheduler 620 may further schedule tasks 610 such that, at any given moment, the task with the highest priority among all tasks that are ready for execution is processed by processing module 630. Processing module 630 processes each task 610 that is scheduled by scheduler 620. Processing module 630 also sets events as appropriate.

Scheduler 620 may be implemented in various manners. For example, scheduler 620 may be part of an operating system used for a computing device or a personal electronic device. Scheduler 620 may also be a controller designated to schedule tasks 610 for processing module 630. Scheduler 620 may thus be implemented in hardware, software, or a combination thereof.

Processing module 630 may also be implemented in hardware, software, or a combination thereof. Processing module 630 may perform any type of processing for the scheduled tasks. For example, processing module 630 may be a storage controller, a memory driver, a bus driver, a direct memory access (DMA) controller, a digital signal processor (DSP), a reduced instruction set computer (RISC), a microprocessor, and so on.

The event setting techniques and multi-threaded systems described herein may be employed in various electronic devices. For example, these techniques and multi-threaded systems may be used in a computer system, a personal electronic device, and so on. The personal electronic device may be a wireless device, a PDA, and so on.

Figure 7:
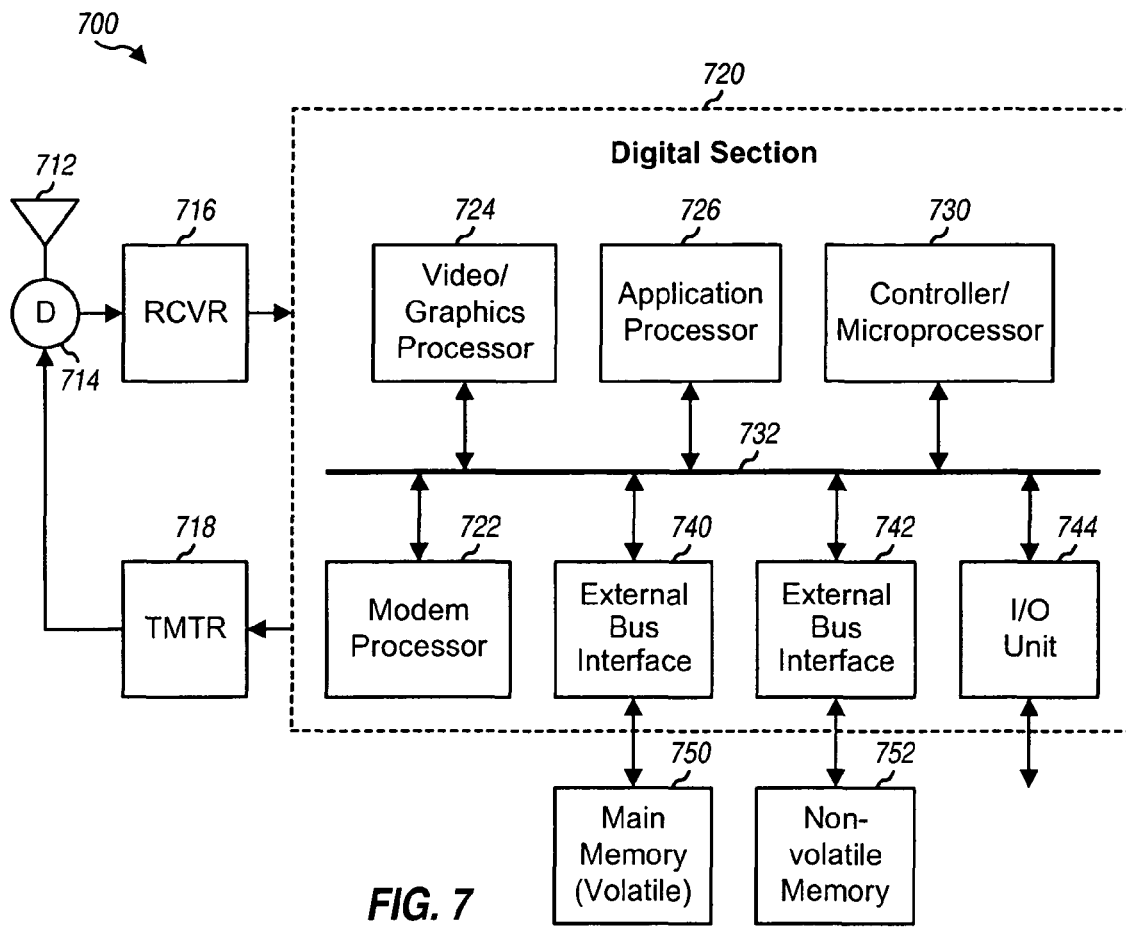
FIG. 7 shows a block diagram of a wireless device.

FIG. 7 shows a block diagram of a wireless device 700 in which the event setting techniques may be employed. Wireless device 700 may be a cellular phone, a terminal, a handset, or some other apparatus. Wireless device 700 may be capable of communicating with a Code Division Multiple Access (CDMA) system, a Global System for Mobile Communications (GSM) system, and so on.

Wireless device 700 provides bidirectional communication via a receive path and a transmit path. For the receive path, forward link signals transmitted by base stations are received by an antenna 712, routed through a duplexer (D) 714, and provided to a receiver unit (RCVR) 716. Receiver unit 716 conditions and digitizes the received signal and provides input samples to a digital section 720 for further processing. For the transmit path, a transmitter unit (TMTR) 718 receives from digital section 720 data to be transmitted, processes and conditions the data, and generates a reverse link signal, which is routed through duplexer 714 and transmitted via antenna 712 to the base stations.

Digital section 720 includes various processing units and interface units such as, for example, a modem processor 722, a video/graphics processor 724, an application processor 726, a controller/microprocessor 730, external bus interfaces (EBIs) 740 and 742, and an input/output (I/O) unit 744. Modem processor 722 performs processing for data transmission and reception (e.g., encoding, modulation, demodulation, decoding, and so on). Video/graphics processor 724 performs processing on still images, moving videos, moving texts, graphics for video games, 3-D avatars, and so on. Application processor 726 performs processing for applications such as, e.g., multi-way calls, web browsing, media player, user interface, and so on. EBI 740 facilitates transfer of data between digital section 720 and a volatile main memory 750, which may be a RAM, an SRAM, a DRAM, an SDRAM, and so on. EBI 742 facilitates transfer of data between digital section 720 and a non-volatile memory 752, which may be a Flash memory or a ROM. I/O unit 744 interfaces with external I/O devices such as an LCD unit, a keypad, a speaker, a microphone, and so on (not shown in FIG. 7). The various units within digital section 720 may communicate with one another via one or more buses 732.

Digital section 720 may be implemented with one or more DSPs, micro-processors, RISCs, and so on. Digital section 720 may also be fabricated on one or more application specific integrated circuits (ASICs) or some other type of integrated circuits (ICs). Multi-threaded systems 100 and/or 600 may be implemented within digital section 720. As an example for multi-threaded system 100, microprocessor 730 may be running a real-time operating system, and threads 110 may be invoked by various processors within digital section 720. As another example for multi-threaded system 600, microprocessor 730 may implement scheduler 620, EBI 740 may implement processing module 630, and tasks 610 may be generated by the various processors within digital section 720.

Figure 8:
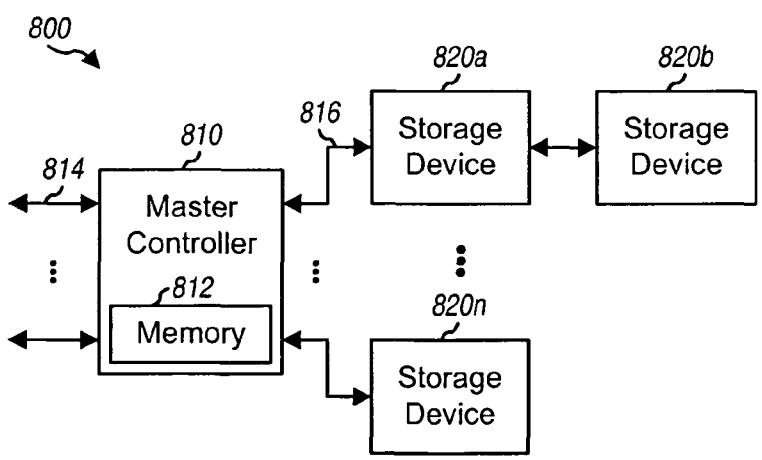
FIG. 8 shows a block diagram of a storage system.

FIG. 8 shows a block diagram of a storage system 800 in which the event setting techniques may also be employed. Storage system 800 includes a master controller 810 and multiple storage devices 820. Master controller 810 may be a stand-alone computing device, part of a computing device, and so on. A memory unit 812 stores data and codes used by master controller 810.

Master controller 810 communicates with external devices (not shown in FIG. 8) via one or more external interfaces 814. Master controller 810 further couples to storage devices 820 via one or more internal interfaces 816. Each interface may also be a bus or some other communication link. Each storage device 820 may couple directly to master controller 810 or via another storage device.

Master controller 810 may implement a scheduler that is responsible for scheduling accesses to storage devices 820. Master controller 810 may receive tasks via external interfaces 814. These tasks may be from external processors and/or applications requesting access of storage devices 820. Master controller 810 then schedules the tasks based on the priorities and pending events for the tasks, the availability of the storage devices, the events set for these storage devices, and so on. Master controller 810 may attempt to schedule the tasks such that the highest priority that is ready is accessing each storage device.

In an embodiment, a separate processing module manages the accesses of each storage device 820. The processing module for each storage device may be a driver that is responsible for writing data to and reading data from that storage device. The processing module may set events based on the state of that processing module and/or the associated storage device. For each storage device 820, master controller 810 may schedule the highest priority ready task to access that storage device 820 whenever an event is set for that device. The processing module for each storage device may implement process 300 or 400 to render the scheduler within master controller 810 ineffective (e.g., by manipulating the priority of the current task) in order to set events without intermediate scheduling by the scheduler.

In another embodiment, storage devices 820 represent tasks that are scheduled by master controller 810. For example, multiple storage devices may require access to a given external interface. Master controller 810 may then schedule these storage devices for use of this external interface based on the priorities of the storage devices, the events set for the external interface, and so on.

The techniques described herein may be used to set events, as described above. These techniques may also be used to set interrupts, to send signals or messages, to set flags, and so on.

The techniques described herein may be implemented by various means. For example, these techniques may be implemented in software, hardware, or a combination thereof. For a software implementation, the techniques may be implemented with modules (e.g., functions, procedures, and so on) that perform the actions described herein. The software codes may be stored in a memory unit (e.g., memory 750 in FIG. 7 or memory 812 in FIG. 8) and executed by a processor (e.g., microprocessor 730 in FIG. 7 or controller 810 in FIG. 8). The memory unit may be implemented within the processor or external to the processor.

For a hardware implementation, the module or function that sets events may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An article comprising:
a non-transitory processor readable medium having stored therein machine readable code that is executable by a processor to:
determine whether a currently active thread is to set at least two events, wherein said at least two events comprise a first event the setting of which initiates scheduling of a pending thread, and a second event the setting of which initiates scheduling of at least one other pending thread; and
in response to a determination that said currently active thread is to set said at least two events, temporarily prohibit hardware timer interrupts and scheduling of said pending thread and said at least one other pending thread until said first and second events are set by said currently active thread.

2. The article of claim 1, wherein said machine readable code is further executable by said processor to:
temporarily prohibit scheduling of said pending thread and said at least one other pending thread by temporarily affecting a priority level of the currently active thread.

3. The article of claim 1, wherein said currently active thread to set said at least two events one event at a time.

4. The article of claim 1, wherein said currently active thread to set said at least two events, at least in part, by calling a function to set at least one of said at least two events.

5. The article of claim 1, wherein said currently active thread to set said at least two events, at least in part, by calling a function in an operating system to individually set each of said at least two events.

6. The article of claim 2, wherein said processor to temporarily affect said priority level, at least in part, by setting said priority level to a highest possible priority level.

7. The article of claim 1, wherein the machine readable code is further executable by said processor to temporarily prohibit scheduling of said pending thread and said at least one other pending thread by temporarily disabling a scheduler of tasks for processing by said processor.

8. The article of claim 7, wherein said processor to temporarily disable said scheduler of tasks using at least one of a time-based mechanism and/or a flag setting mechanism.

9. The article of claim 1, wherein said machine readable code is further executable by said processor to:
in response to said determination that said currently active thread is to set said at least two events, temporarily prohibit scheduling of said pending thread, said at least one other pending thread and all other pending threads until said at least two events are set by said currently active thread.

10. A method of setting events in a multi-threaded system, comprising, with a processor:
determining whether a currently active thread is to set at least two events, wherein said at least two events comprise a first event the setting of which initiates scheduling of a pending thread, and a second event the setting of which initiates scheduling of at least one other pending thread; and
in response to a determination that said currently active thread is to set said at least two events, temporarily prohibiting hardware timer interrupts and scheduling of said pending thread and said at least one other pending thread until said first and second events are set by said currently active thread.

11. The method of claim 10, wherein temporarily prohibiting scheduling of said pending thread and said at least one other pending thread further comprises:
temporarily affecting a priority level of the currently active thread.

12. The method of claim 10, wherein the currently active thread sets said at least two events, one event at a time.

13. The method of claim 11, wherein temporarily affecting the priority level comprises setting the priority level to a highest possible priority level.

14. The method of claim 10, wherein said at least one of said at least two events defines at least one of a condition or status of a thread.

15. The method of claim 10, wherein said at least one event of said at least two events comprises a write complete event.

16. The method of claim 10, wherein said at least one event of said at least two events comprises a memory driver available event.

17. The method of claim 10, wherein temporarily prohibiting scheduling of said pending thread and said at least one other pending thread until said events are set by said currently active thread comprises temporarily disabling a scheduler of tasks for processing by said processor.

18. The method of claim 17, wherein temporarily disabling said scheduler of tasks comprises temporarily disabling said scheduler of tasks using at least one of a time-based mechanism and/or a flag setting mechanism.

19. The method of claim 10, further comprising:
in response to said determination that said currently active thread is to set said at least two events, temporarily prohibiting scheduling of said pending thread, said at least one other pending thread and all other pending threads until said at least two events are set by said currently active thread.

20. An apparatus in a digital section of a device providing a multi-threaded system, the apparatus comprising:
means for determining whether a currently active thread is to set at least two events, wherein said at least two events comprise a first event the setting of which initiates scheduling of a pending thread, and a second event the setting of which initiates scheduling of at least one other pending thread; and
means for temporarily prohibiting hardware timer interrupts and scheduling of said pending thread and said at least one other pending thread until said first and second events are set by said currently active thread, in response to a determination that said currently active thread is to set said at least two events.

21. The apparatus of claim 20, wherein said means for temporarily prohibiting scheduling comprises means for temporarily affecting a priority level of the currently active thread.

22. The apparatus of claim 21, wherein said means for temporarily affecting said priority level comprises means for setting said priority level to a highest possible priority level.

23. The apparatus of claim 20, said means for temporarily prohibiting scheduling of said pending thread and said at least one other pending thread until said first and second events are set by said currently active comprising means for temporarily disabling a means for scheduling of tasks for said means for processing tasks.

24. The apparatus of claim 23, said means for temporarily disabling said means for scheduling tasks comprises means for temporarily disabling said means for scheduling tasks using at least one of a time-based mechanism and/or a flag setting mechanism.

25. The apparatus of claim 20, wherein said means for temporarily prohibiting scheduling of said pending thread and said at least one other pending thread until said at least two events are set by said currently active thread further comprises:
  means for temporarily prohibiting scheduling of said pending thread, said at least one other pending thread and all other pending threads until said at least two events are set by said currently active thread, in response to said determination that said currently active thread is to set said at least two events.

26. An apparatus comprising:
a processor to:
  perform tasks associated with a currently active thread, said currently active thread being identified by a scheduler;
  determine whether said currently active thread is to set at least two events, wherein said at least two events comprise a first event the setting of which initiates scheduling of a pending thread by said scheduler, and a second event the setting of which initiates scheduling of at least one other pending thread; and
  in response to a determination that said currently active thread is to set said at least two events, temporarily prohibit hardware timer interrupts and scheduling of said pending thread and said at least one other pending thread by said scheduler until said first and second events are set by said currently active thread.

27. The apparatus of claim 26, said processor to temporarily prohibit said scheduler from scheduling said pending thread and said at least one other pending thread by affecting a priority level of the currently active thread.

28. The apparatus of claim 27, said processor to set said priority level to a highest possible priority level.

29. The apparatus of claim 26, wherein said currently active thread is operative to set said at least two events, one event at a time.

30. The apparatus of claim 26, said processor to temporarily prohibit scheduling of said pending thread and said at least one other pending thread by temporarily disabling a scheduler of tasks.

31. The apparatus of claim 30, said processor to temporarily disable said scheduler of tasks using at least one of a time-based mechanism and/or a flag setting mechanism.

32. The apparatus of claim 26, said processor to:
  in response to said determination that said currently active thread is to set said at least two events, temporarily prohibit scheduling of said pending thread, said at least one other pending thread and all other pending threads by said scheduler until said at least two events are set by said currently active thread.

* * * * *